(12) United States Patent
Obara

(10) Patent No.: US 6,227,714 B1
(45) Date of Patent: *May 8, 2001

(54) COMPOUND BEARING ASSEMBLY FOR SWING ARM OF HARD DISC DRIVE

(75) Inventor: Rikuro Obara, Nagano-ken (JP)

(73) Assignee: Minebea Kabushiki Kaisha, Nagano-Ken (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/736,451

(22) Filed: Oct. 24, 1996

(30) Foreign Application Priority Data

Oct. 25, 1995 (JP) .................................................... 7-300608
Oct. 25, 1995 (JP) .................................................... 7-300609

(51) Int. Cl.[7] ...................................................... F16C 19/10
(52) U.S. Cl. ......................... 384/512; 384/517; 384/537; 384/613
(58) Field of Search .................................. 384/517, 613, 384/512, 537, 543

(56) References Cited

U.S. PATENT DOCUMENTS 5,341,569    8/1994   Takamizawa .
5,463,861 *  11/1995  Lorenz ................................. 384/517
5,547,291 *  8/1996   Miyazaki et al. .................... 384/517
5,556,209 *  9/1996   Obara et al. ......................... 384/517

FOREIGN PATENT DOCUMENTS 0613134    8/1994   (EP) .
2565017    11/1985  (FR) .

* cited by examiner

Primary Examiner—Lenard A. Footland
(74) Attorney, Agent, or Firm—Israel Gopstein

(57) ABSTRACT

A compound bearing assembly for a swing arm is disclosed, which comprises a stepped shaft 1 having a large-diameter portion 1a and a small-diameter portion 1b, the large-diameter portion 1a having an inner raceway groove 2a directly formed in the inner periphery, a sleeve-like outer race ring 5 surrounding the stepped shaft 1 and having a distinct-member outer race ring 3 provided adjacent one end and also having an outer raceway groove directly formed in the inner periphery of a portion adjacent the outer end, a plurality of balls 4 provided between the inner raceway groove 2a directly formed in the large-diameter portion 1a and an outer raceway groove 2a formed in the distinct-member outer race ring 3, and a plurality of other balls 8a provided between an inner raceway groove formed in an inner race ring 7a fitted on the small-diameter portion 1b of the stepped shaft 1 and the outer raceway groove 2b directly formed in the inner periphery of the sleeve-like outer race ring 5.

9 Claims, 4 Drawing Sheets

COMPOUND BEARING ASSEMBLY FOR SWING ARM OF HARD DISC DRIVE

BACKGROUND OF THE INVENTION

1. Field of the Invention

This invention relates to a compound bearing assembly for supporting a swing arm of a hard disc drive.

2. Description of the Prior Art

A prior art hard disc drive as shown in FIG. 4 comprises a magnetic disc 11 which is driven for rotation by a motor M, and a swing arm (or head arm) 13 carrying at the end thereof a magnetic head 12 for writing data in the disc 13 at a predetermined position thereof and reading out data from the disc 13 at a given position thereof.

The swing arm 13 has a base part rotatably supported by a compound bearing assembly which uses two ball bearing units. As shown in FIG. 6, a prior art bearing assembly for supporting the swing arm comprises two ball bearing units A and B and a sleeve-like spacer C. These components of the bearing assembly are produced separately and supplied to the user, i.e., the hard disc drive manufacturer or the swing arm manufacturer, to be assembled on a shaft D.

In other words, with the conventional swing arm support bearing assembly, the user has to assemble the two ball bearing units on the shaft via the spacer. This poses the following problems.

(a) The shaft has to be sized in its production to the inner diameter of the inner race rings of the ball bearing units. In addition, its rigidity is subject to restrictions.

(b) The spacer should have highly accurate parallelism between and flatness of its opposite end finished surfaces.

(c) It is necessary to provide uniform contact between the opposite end surfaces of the spacer and the corresponding end surfaces of the outer race rings of the ball bearing units, thus requiring highly accurate finishing.

(d) For the above reasons, the assembling by the user cannot be easily done.

SUMMARY OF THE INVENTION

An object of the invention is to provide a compound bearing assembly, which can solve the problems discussed above and be used directly by a hard disc drive manufacturer as its user for a swing arm of a hard disc drive.

In a compound bearing assembly for a swing arm according to a first aspect of the invention, a plurality of balls are provided between an outer raceway groove formed in the inner periphery of an outer race ring and an inner raceway groove directly formed in the outer periphery of a large-diameter portion of a stepped shaft, which has the large-diameter portion and a small-diameter portion, and a plurality of other balls provided between an inner raceway groove formed in the outer periphery of an inner race ring fitted on the small-diameter portion of the stepped shaft and an outer raceway groove directly formed in the inner periphery of an end portion of a sleeve-like outer race ring.

In a compound bearing assembly for a swing arm according to a second aspect of the invention, a plurality of balls are provided between an outer raceway groove directly formed in the inner periphery of an end portion of a sleeve-like outer race ring and an inner raceway groove directly formed in the outer periphery of a large-diameter portion of a stepped shaft, which has the large-diameter portion and a small-diameter portion, and a ball bearing unit having an inner and an outer race ring and a plurality of other balls provided therebetween has its inner race ring fitted on the small-diameter portion of the stepped shaft.

In a compound bearing assembly for a swing arm according to a third aspect of the invention, a plurality of balls are provided between an inner raceway groove directly formed in the outer periphery of a large-diameter portion of a stepped shaft, which has the large-diameter portion and a small-diameter portion, and an outer raceway groove formed in the inner periphery of an outer race ring provided around the large-diameter portion, and a ball bearing unit having an inner and an outer race ring and a plurality of other balls provided therebetween has its inner race ring fitted on the small-diameter portion of the stepped shaft with a sleeve-like spacer clampedly interposed between the outer race ring of the ball bearing unit and the outer race ring provided around the large-diameter portion.

According to the first aspect of the invention, the inner race ring fitted on the small-diameter portion of the stepped shaft has an equal outer diameter to the outer diameter of the large-diameter portion of the stepped shaft, so that all the balls are the same in diameter.

According to the second and third aspects of the invention, the inner race ring of the ball bearing unit has an equal outer diameter to the outer diameter of the large-diameter portion of the stepped shaft, and the outer race ring of the ball bearing unit has equal outer and inner diameters to the outer and inner diameters, respectively, of the sleeve-like outer race ring, so that all the balls are the same in diameter.

DETAILED DESCRIPTION OF THE PREFERRED EMBODIMENTS

Figure 1:
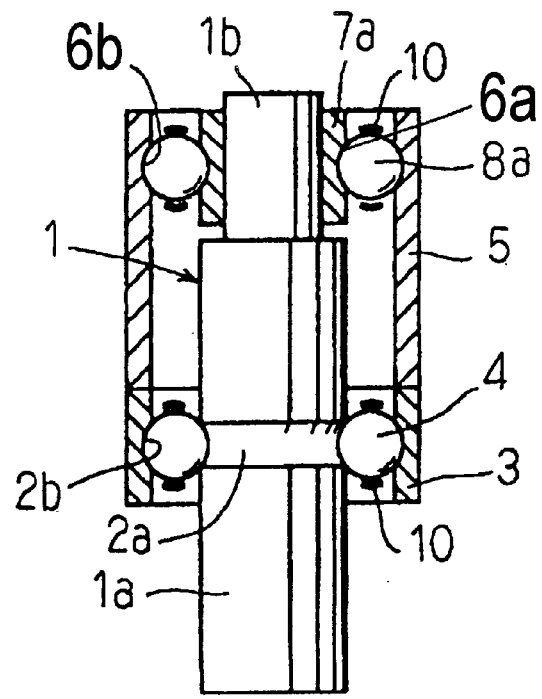
FIG. 1 is a sectional view showing a first embodiment of the compound bearing assembly according to the invention.

Referring to FIG. 1 showing a first embodiment of the invention, reference numeral 1 designates a stepped shaft having a large-diameter portion 1*a* and a small-diameter portion 1*b*, the large-diameter portion 1*a* having an inner raceway groove 2*a* directly formed in the outer periphery.

Reference numeral 3 designates an outer race ring, which is assembled on the large-diameter portion 1*a* of the stepped shaft 1 with a plurality of balls 4 provided between an outer raceway groove 2*b* formed in its inner periphery and the outer raceway groove 2*a* formed in the large-diameter portion 1*a*.

Reference numeral 5 designates a sleeve-like outer race ring, which surrounds the stepped shaft 1 and has an outer raceway groove 6*b* directly formed in the inner periphery of its outer end portion (i.e., an upper end portion in FIG. 1). The sleeve-like outer race ring 5 is assembled on the stepped shaft 1 with a plurality of balls 8a provided between the outer raceway groove 6b and an inner raceway groove 6a formed in the outer periphery of an inner race ring 7a fitted on the small-diameter portion 1b of the stepped shaft 1.

The inner race ring 7a fitted on the small-diameter portion 1b of the stepped shaft 1 has an equal outer diameter to the outer diameter of the large-diameter portion 1a of the stepped shaft 1, so that the balls 4 and 8a are the same in diameter.

In assembling, the inner race ring 7a, for instance, is initially slidably fitted on the small-diameter portion 1a of the stepped shaft 1. Then, an adequate pre-load is applied to the outer end surface (i.e., upper end surface in FIG. 1) of the inner race ring 7a, and in this state the inner race ring 7a is secured by means of an adhesive to the small-diameter portion 1a of the stepped shaft 1. In this way, the outer race ring 3, the sleeve-like outer race ring 5 and the inner race ring 7a are assembled on the stepped shaft 1.

In this structure, the sleeve-like outer race ring 5 and the outer race ring 3 are made integral to be a compound member while the outer race ring 3, the sleeve-like outer race ring 5 and the inner race ring 7a are assembled on the stepped shaft 1.

Figure 5:
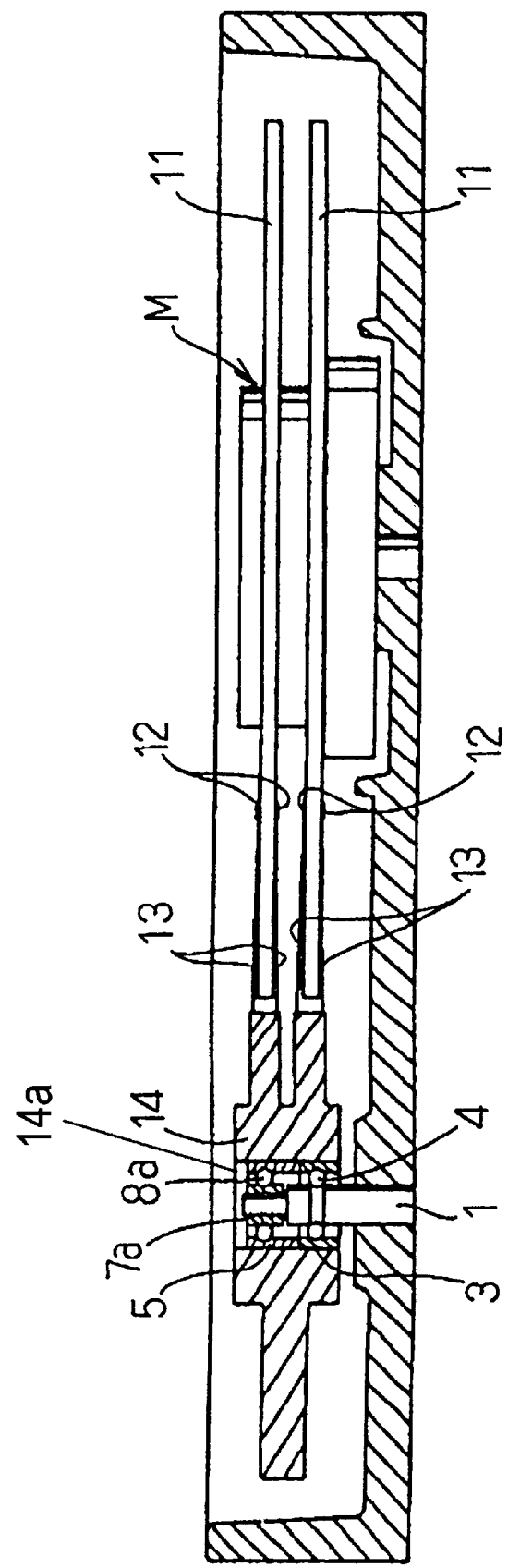
FIG. 5 is a sectional view showing a swing arm supported by a compound bearing assembly according to a first aspect of the invention.
Figure 6A:
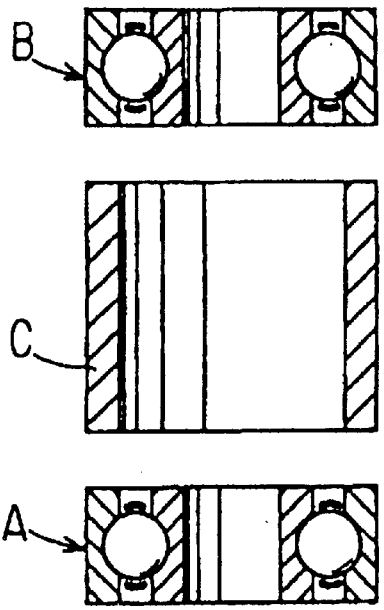
FIGS. 6(*a*) and 6(*b*) are sectional views showing a prior art swing arm bearing assembly, FIG. 6(*a*) showing ball bearing units and a sleeve-like spacer before being assembled, FIG. 6(*b*) showing the ball bearing units and sleeve-like spacer having been assembled on a shaft.
Figure 6B:
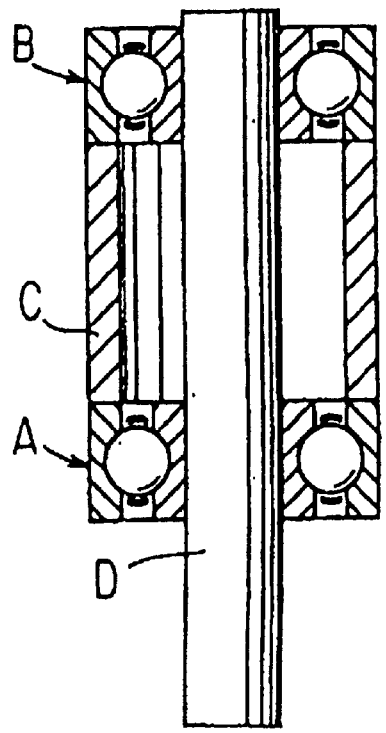

As shown in FIG. 5, the stepped shaft 1 of the compound bearing assembly according to the invention, which is obtained in the above way, is erected from a base of a hard disc drive by securing the bottom end of its large-diameter portion 1a to the base. Then, a central hole 14a formed axially through a boss 14 of a swing arm 13 is fitted on the compound bearing assembly and the boss 14 is secured by means of an adhesive to the compound bearing assembly.

The swing arm 13 which is thus mounted on the compound bearing assembly is rotatable about the same.

Figure 2:
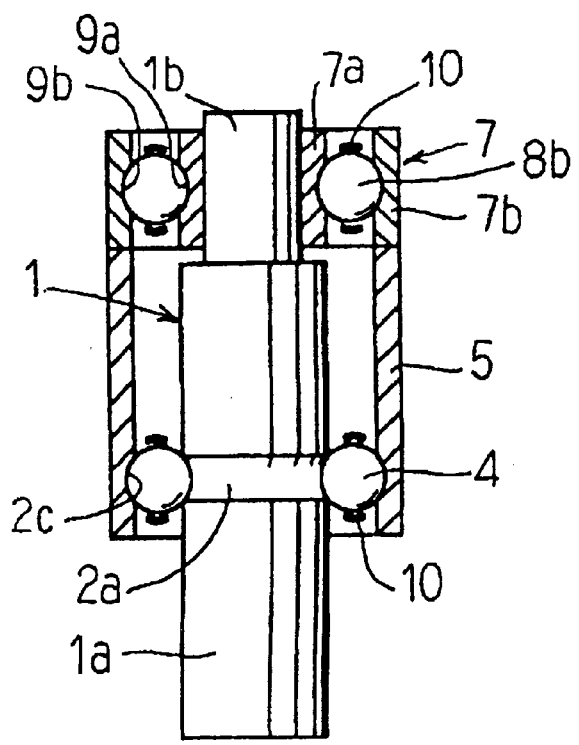
FIG. 2 is a sectional view showing a second embodiment of the compound bearing assembly according to the invention.

FIG. 2 shows a second embodiment of the invention. Again in this embodiment, the large-diameter portion 1a of the stepped shaft 1 has the inner raceway groove 2a directly formed in the outer periphery thereof.

In this embodiment, a sleeve-like outer race ring 5 which surrounds the stepped shaft 1, has an outer raceway groove 2c directly formed in the inner periphery of an end portion (i.e., a lower end portion in FIG. 2) of it. The balls 4 are provided between the outer raceway groove 2C and the inner raceway groove 2a of the large-diameter portion 1a.

A ball bearing unit 7 which has an inner and an outer race ring 7a and 7b and a plurality of balls 8b provided therebetween, has the inner race ring 7a fitted on and secured to the small-diameter portion 1b of the stepped shaft 1.

The inner race ring 7a of the ball bearing unit 7 has an equal outer diameter to the outer diameter of the large-diameter portion 1a of the stepped shaft 1, and the outer race ring 7b has equal outer and inner diameters to the outer and inner diameters, respectively, of the sleeve-like outer race ring 5, so that the balls 4 and 8b are the same in diameter.

In assembling, the inner race ring 7a of the ball bearing unit 7, for instance, is initially slidably fitted on the small-diameter portion 1b of the stepped shaft 1. Then, an adequate pre-load is applied to the outer end surface (i.e., upper end surface in FIG. 2) of the inner race ring 7a, and in this state the inner race ring 7a is secured by means of an adhesive to the small-diameter portion 1b of the stepped shaft 1.

In this way, the sleeve-like outer race ring 5 and the outer race ring 7b of the ball bearing unit 7 are made integral to be a compound member, and the sleeve-like outer race ring 5, and the inner and outer race rings 7a and 7b of the ball bearing unit 7 are assembled on the stepped shaft 1.

As described above, the stepped shaft of the compound bearing assemmbly according to the invention which is thus obtained, is erected from a base of a hard disc drive by securing the stem of its large-diameter portion to the base, and then a central hole 14a formed axially through a boss 14 of a swing arm 13 is fitted on the compound bearing assembly and the boss 14 is secured by means of an adhesive to the compound bearing assembly according to the invention.

Figure 3:
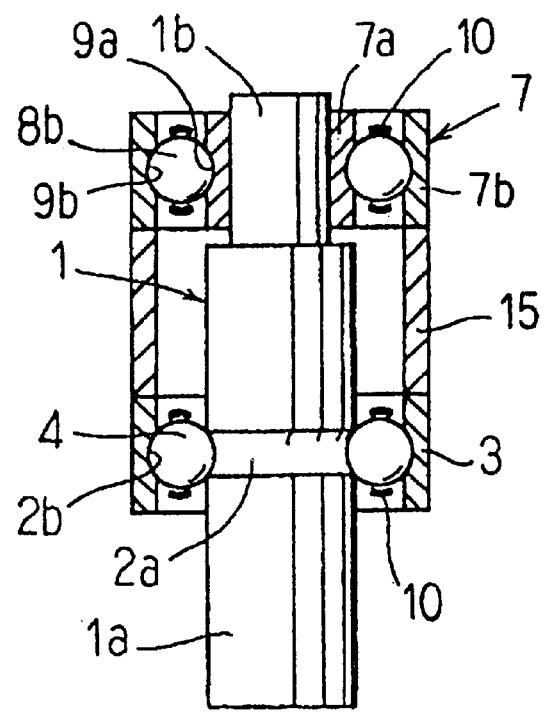
FIG. 3 is a sectional view showing a third embodiment of the compound bearing assembly according to the invention.
Figure 4:
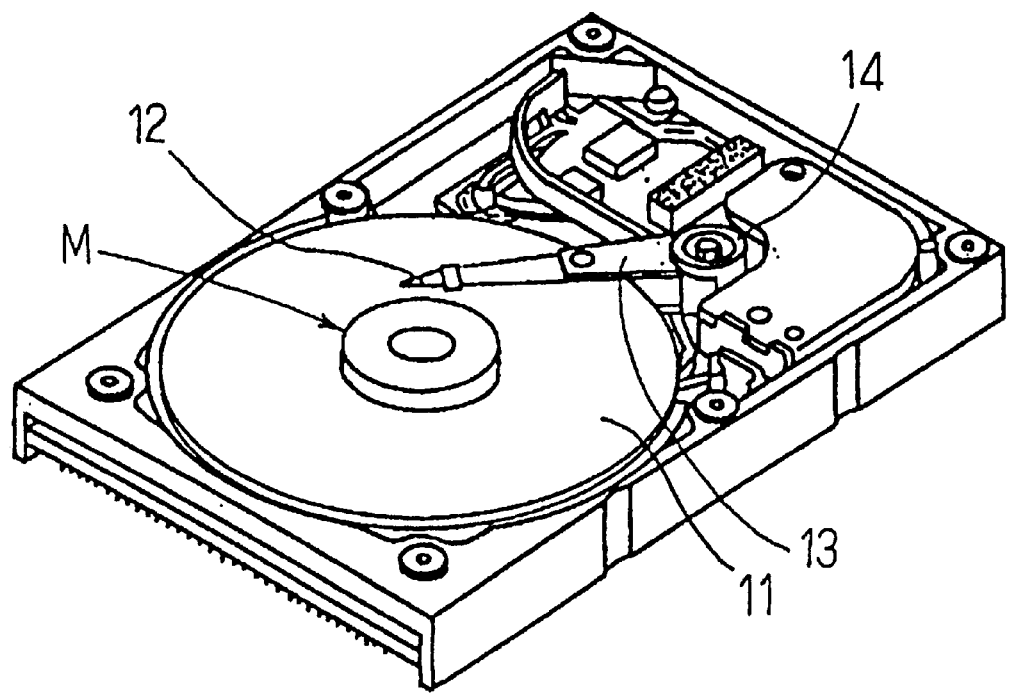
FIG. 4 is a perspective view showing a hard disc drive.

FIG. 3 shows a third embodiment of the invention.

In this embodiment, an outer race ring 3 and a ball bearing unit 7 are provided on the large- and small-diameter portions 1a and 1b of the stepped shaft 1, respectively, and a sleeve-like spacer 15 surrounding the stepped shaft 1 is clampedly interposed between the outer race ring 3 and the outer race ring 7b of the ball bearing unit 7.

The inner race ring 7a of the ball bearing unit 7 has an equal outer diameter to the outer diameter of the large-diameter portion 1a of the stepped shaft 1, and the outer ring 7b of the ball bearing unit 7 has equal outer and inner diameters to the outer and inner diameters, respectively, of the outer race ring 3 around the large-diameter portion 1a, so that all the balls are the same in diameter.

In assembling, like the preceding second embodiment, the inner race ring 7a of the ball bearing unit 7 is initially slidably fitted on the small-diameter portion 1b of the stepped shaft 1, then an adequate pre-load is applied to the outer end surface (i.e., upper end surface in FIG. 3) of the inner race ring 7a, and in this state the inner race ring 7a is secured by means of an adhesive to the small-diameter portion 1b of the stepped shaft 1.

In this way, the spacer 15 and the opposite end outer race rings 3 and 7b are made integral to be a compound sleeve-like outer race ring, and the outer race rings 3 and 7b, the spacer 15 and the inner race ring 7a are assembled on the stepped shaft 1.

Like the above first and second embodiments, the stepped shaft 1 of the compound bearing assembly according to the invention which is thus obtained, is erected from a base of a hard disc drive by securing the stem of its large-diameter portion to the base, and a central hole 14a formed axially through a boss 14 a swing arm 13 is fitted on the compound bearing assembly and the boss 14 is secured by means of an adhesive to the compound bearing assembly according to the invention.

Reference symbols 9a and 9b designate the raceway grooves formed in the inner and outer race rings 7a and 7b of the ball bearing unit 7, respectively, and reference numeral 10 designates ball retainers.

While in the above first to third embodiments the balls that were used were all the same in diameter, it is possible to use balls having different diameters on the sides of the large- and small-diameter portions 1a and 1b of the stepped shaft 1, respectively.

With the compound bearing assembly for a swing arm according to the invention having the construction as described in the foregoing, the following advantageous functions and effects are obtainable.

(1) Since according to the invention the components of the compound bearing assembly, i.e., the sleeve-like outer race ring or spacer, the inner race ring, the outer race ring, the balls and the shaft, are all assembled by the bearing assembly manufacturer, the user need not assembly any of these components, and the compound bearing assembly can be readily and reliably mounted on a swing arm of a hard disc drive by fitting the swing arm stem boss 14 on and securing the same by means of an adhesive to it.

(2) Since the large-diameter portion of the stepped shaft in the bearing assembly has the inner raceway groove directly formed in its outer periphery, the conventional inner race ring is unnecessary, and correspondingly the shaft is partly increased in diameter to provide the stepped shaft, which thus has increased rigidity.

(3) Only a single conventional ball bearing unit, and hence only a single inner race ring, is needed, and it is possible to provide a bearing assembly having a reduced number of components.

(4) In the first and second embodiments of the invention, the sleeve-like outer race ring also serves as a spacer, and the conventional spacer is unnecessary, thus permitting reduction of the number of components.

(5) The sleeve-like outer race ring or the spacer is fabricated highly accurately by the bearing assembly manufacturer, thus improving the accuracy of assembling.

What is claimed is:

1. A combination of a compound bearing assembly for a swing arm of a hard disc drive and a swinig arm mounted thereon, comprising:
    a compound bearing, including:
        a stepped shaft (1) having a large-diameter portion (1a) and a small-diameter portion (1b), said large-diameter portion (1a) having one inner raceway groove (2a) directly formed in an outer peripheral surface thereof,
        a distinct-member ball bearing unit (7);
        an elongated sleeve-like outer race ring (5) surrounding said large-diameter portion (1a) of said stepped shaft (1),
            said sleeve-like outer race ring (5) having one end thereof adjacent a distinct-member outer race ring (7b) of said distinct-member ball bearing unit (7);
            said sleeve-like outer race ring (5) having only one outer raceway groove (2c) directly formed in an inner peripheral surface thereof adjacent the other end thereof;
            said distinct-member outer race ring (7b) having an outer raceway groove (9b) formed in an inner peripheral surface thereof;
            said distinct-member outer race ring (7b) being longitudinally adjacent to and longitudinally distinct from said sleeve-like outer race ring (5);
            said sleeve-like outer race ring (5) being longer than said distinct-member outer race ring (7b) of said distinct-member ball bearing unit (7);
        a plurality of balls (4) received in said inner raceway groove (2a) directly formed in said large-diameter portion (1a) and retained in said outer raceway groove (2c) directly formed in said inner peripheral surface of said sleeve-like outer race ring (5); and
        a plurality of other balls (8b) received in an inner raceway groove (9a) formed in an inner race ring (7a) of said distinct-member ball bearing unit (7), said inner race ring (7a) fitted on said small-diameter portion (1b) of said stepped shaft (1), said other balls (8b) retained in said outer raceway groove (9b) formed in said distinct-member outer race ring (7b); and
    a swing arm of a hard disc drive mounted on said compound bearing,
        wherein said swing arm includes a boss (14) having a central hole (14a) formed axially therethrough,
        said boss being mounted within said central hole (14a) to said sleeve-like outer race ring (5) and to said distinct-member outer race ring (7b) and rotatable about said compound bearing assembly.

2. The compound bearing assembly combination according to claim 1 wherein said sleeve-like outer race ring (5) extends longitudinally over at least a portion of said small-diameter portion (1b) of said stepped shaft (1) and a portion of said large-diameter portion (1a) of said stepped shaft (1).

3. The compound bearing assembly combination according to claim 2 wherein said boss of said swing arm is adhesively fixed within said central hole to the sleeve-like outer race ring (5) and to the distinct-member outer race ring (7b).

4. The compound bearing assembly combination according to claim 1 wherein said boss of said swing arm is adhesively fixed within said central hole to the sleeve-like outer race ring (5) and to the distinct-member outer race ring (7b).

5. A compound bearing assembly for a swing arm of a hard disc drive comprising:
    a stepped shaft (1) having a large-diameter portion (1a) and a small-diameter portion (1b), said large-diameter portion (1a) having one inner raceway groove (2a) directly formed in an outer peripheral surface thereof;
    a distinct-member ball bearing unit (7);
    an elongated sleeve-like outer race ring (5) surrounding said large-diameter portion (1a) of said stepped shaft (1),
        said sleeve-like outer race ring (5) having one end thereof adjacent a distinct-member outer race ring (7b) of said distinct-member ball bearing unit (7);
        said sleeve-like outer race ring (5) having only one outer raceway groove (2c) directly formed in an inner peripheral surface thereof adjacent the other end thereof;
        said distinct-member outer race ring (7b) having an outer raceway groove (9b) formed in an inner peripheral surface thereof and being longitudinally adjacent to said sleeve-like outer race ring (5);
        said sleeve-like outer race ring (5) being longer than said distinct-member outer race ring (7b) of said distinct-member ball bearing unit (7);
    a plurality of balls (4) received in said inner raceway groove (2a) directly formed in said large-diameter portion (1a) and retained in said outer raceway groove (2c) directly formed in said inner peripheral surface of said sleeve-like outer race ring (5); and
    a plurality of other balls (8b) received in an inner raceway groove (9a) formed in an inner race ring (7a) of said distinct-member ball bearing unit (7), said inner race ring (7a) fitted on said small-diameter portion (1b) of said stepped shaft (1), said other balls (8b) retained in said outer raceway groove (9b) formed in said distinct-member outer race ring (7b);
    wherein said swing arm of a hard disc drive is mounted on said sleeve-like outer race ring (5) and on said distinct-member outer race ring (7b) and is rotatable about said compound bearing assembly.

6. The compound bearing assembly for a swing arm of a hard disc drive according to claim 5, wherein
    said distinct-member outer race ring (7b) of said distinct-member ball bearing unit (7) is fitted on an upper end of said sleeve-like outer race ring (5).

7. The compound bearing assembly for a swing arm of a hard disc drive according to claim 5, wherein said inner race ring (7a) of said distinct-member ball bearing unit (7) and said large-diameter portion (1a) of said stepped shaft (1) have equal outer diameters, and said distinct-member outer race ring (7b) of said distinct-member ball bearing unit (7) having outer and inner diameters respectively equal to outer and inner diameters of said sleeve-like outer race ring (5), so that all said balls (4), (8b) have a same diameter.

8. The compound bearing assembly combination according to claim 5 wherein said sleeve-like outer race ring (5) extends longitudinally over at least a portion of said small-diameter portion (1b) of said stepped shaft (1) and a portion of said large-diameter portion (1a) of said stepped shaft (1).

9. A compound bearing assembly for a swing arm of a hard disc drive, comprising:

a stepped shaft (1) having a large-diameter portion (1a) and a small-diameter portion (1b), said large-diameter portion (1a) having one inner raceway groove (2a) directly formed in an outer peripheral surface thereof;

a distinct-member ball bearing unit (7);

an elongated sleeve-like outer race ring (5) surrounding said large-diameter portion (1a) of said stepped shaft (1), said sleeve-like outer race ring (5) having one end thereof adjacent a distinct-member outer race ring (7b) of said distinct-member ball bearing unit (7);

said sleeve-like outer race ring (5) having only one outer raceway groove (2c) directly formed in an inner peripheral surface thereof adjacent the other end thereof;

said distinct-member outer race ring (7b) having an outer raceway groove (9b) formed in an inner peripheral surface thereof;

said distinct-member outer race ring (7b) being longitudinally adjacent to and longitudinally distinct from said sleeve-like outer race ring (5);

said sleeve-like outer race ring (5) being longer than said distinct-member outer race ring (7b) of said distinct-member ball bearing unit (7);

a plurality of balls (4) received in said inner raceway groove (2a) directly formed in said large-diameter portion (1a) and retained in said outer raceway groove (2c) directly formed in said inner peripheral surface of said sleeve-like outer race ring (5); and a plurality of other balls (8b) received in an inner raceway groove (9a) formed in an inner race ring (7a) of said distinct-member ball bearing unit (7), said inner race ring (7a) fitted on said small-diameter portion (1b) of said stepped shaft (1), said other balls (8b) retained in said outer raceway groove (9b) formed in said distinct-member outer race ring (7b); wherein said sleeve-like outer race ring (5) extends longitudinally over at least a portion of said small-diameter portion (1b) of said stepped shaft (1) and a portion of said large-diameter portion (1a) of said stepped shaft (1), and wherein said swing arm of a hard disc drive is mounted on said sleeve-like outer race ring (5) and said distinct-member outer race ring (7b) and is rotatable about said compound bearing.

\* \* \* \* \*